US012099324B2

(12) United States Patent
Uohashi

(10) Patent No.: US 12,099,324 B2
(45) Date of Patent: Sep. 24, 2024

(54) IMAGE FORMING APPARATUS

(71) Applicant: KYOCERA Document Solutions Inc., Osaka (JP)

(72) Inventor: Yuki Uohashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/359,932

(22) Filed: Jul. 27, 2023

(65) Prior Publication Data

US 2024/0036509 A1 Feb. 1, 2024

(30) Foreign Application Priority Data

Jul. 28, 2022 (JP) ................................ 2022-120706

(51) Int. Cl.
*G03G 21/16* (2006.01)

(52) U.S. Cl.
CPC ................................ *G03G 21/1647* (2013.01)

(58) Field of Classification Search
CPC ........... G03G 21/1647; G03G 21/1619; G03G 2221/1678
See application file for complete search history.

(56) References Cited

U.S. PATENT DOCUMENTS

| | | | | |
|---|---|---|---|---|
| 6,374,068 | B1 | 4/2002 | Nakaue et al. | |
| 9,146,530 | B2 * | 9/2015 | Seto | G03G 21/1871 |
| 2017/0160697 | A1 * | 6/2017 | Sato | G03G 21/1647 |
| 2019/0227479 | A1 * | 7/2019 | Suzuki | G03G 21/1647 |

FOREIGN PATENT DOCUMENTS

| | | | |
|---|---|---|---|
| JP | 2001-034023 | A | 2/2001 |
| JP | 2008-298995 | A | 12/2008 |

* cited by examiner

*Primary Examiner* — Sandra Brase
(74) *Attorney, Agent, or Firm* — Studebaker & Brackett PC

(57) ABSTRACT

An image forming apparatus includes an image forming unit, a body housing and a temporarily placement part. The image forming forms an image. The image forming unit is attached to and detached from the body housing. The temporarily placement part is deployed outside the body housing, and the image forming unit can be temporarily placed on the temporarily placement part. The temporarily placement part includes an upper cover which coves an upper portion of the image forming unit placed on the temporarily placement part.

8 Claims, 10 Drawing Sheets

IMAGE FORMING APPARATUS

INCORPORATION BY REFERENCE

This application is based on and claims the benefit of priority from Japanese patent application No. 2022-120706 filed on Jul. 28, 2022, which is incorporated by reference in its entirety.

BACKGROUND

The present disclosure relates to an image forming apparatus.

An image forming apparatus in which a group of devices such as a developing device and a photosensitive drum are constituted as a detachable image forming unit is known. The image forming unit is detached when it needs to be replaced due to its life, when the member needs to be cleaned, or when a sheet jam occurs. However, in a case where there are few places on which an object is placed around the image forming apparatus, such as in a small office, it needs a time to find a place on which the detached image forming unit is placed or the detached image forming unit is forced to be placed in a small space. As a result, the user may come into contact with the photosensitive drum, the developing roller or the like, resulting in degradation of image quality or damage to the members.

Therefore, it has been considered to provide a place on which an object is placed in the image forming apparatus. For example, a storage container may be provided, which includes an attachment part engageable with an engagement part provided on the upper surface of the body housing. Alternatively, a storage recess and a lid for opening and closing the storage recess may be provided on the upper surface of the image forming apparatus.

However, since the former storage container is engaged with the body housing with the lid opened, dust adhesion, light exposure and user contact may not be prevented. Also, because the storage container is the container in which the replacement toner cartridge is packed, it cannot be used for work in which the toner cartridge is not replaced (for example, cleaning the members, removing the jammed sheet or the like). In addition, the latter storage recess has a generic configuration, so it does not have a mechanism to protect the image forming unit. In addition, since the storage recess is provided on the upper surface of the image forming apparatus, the size of the image forming apparatus becomes large in order to secure a space in which the image forming unit is placed.

SUMMARY

An image forming apparatus according to the present disclosure includes an image forming unit, a body housing and a temporarily placement part. The image forming forms an image. The image forming unit is attached to and detached from the body housing. The temporarily placement part is deployed outside the body housing, and the image forming unit can be temporarily placed on the temporarily placement part. The temporarily placement part includes an upper cover which coves an upper portion of the image forming unit placed on the temporarily placement part.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereafter, a printer 1 (an example of an image forming apparatus) according to one embodiment of the present disclosure will be described with reference to the drawings.

Figure 1:
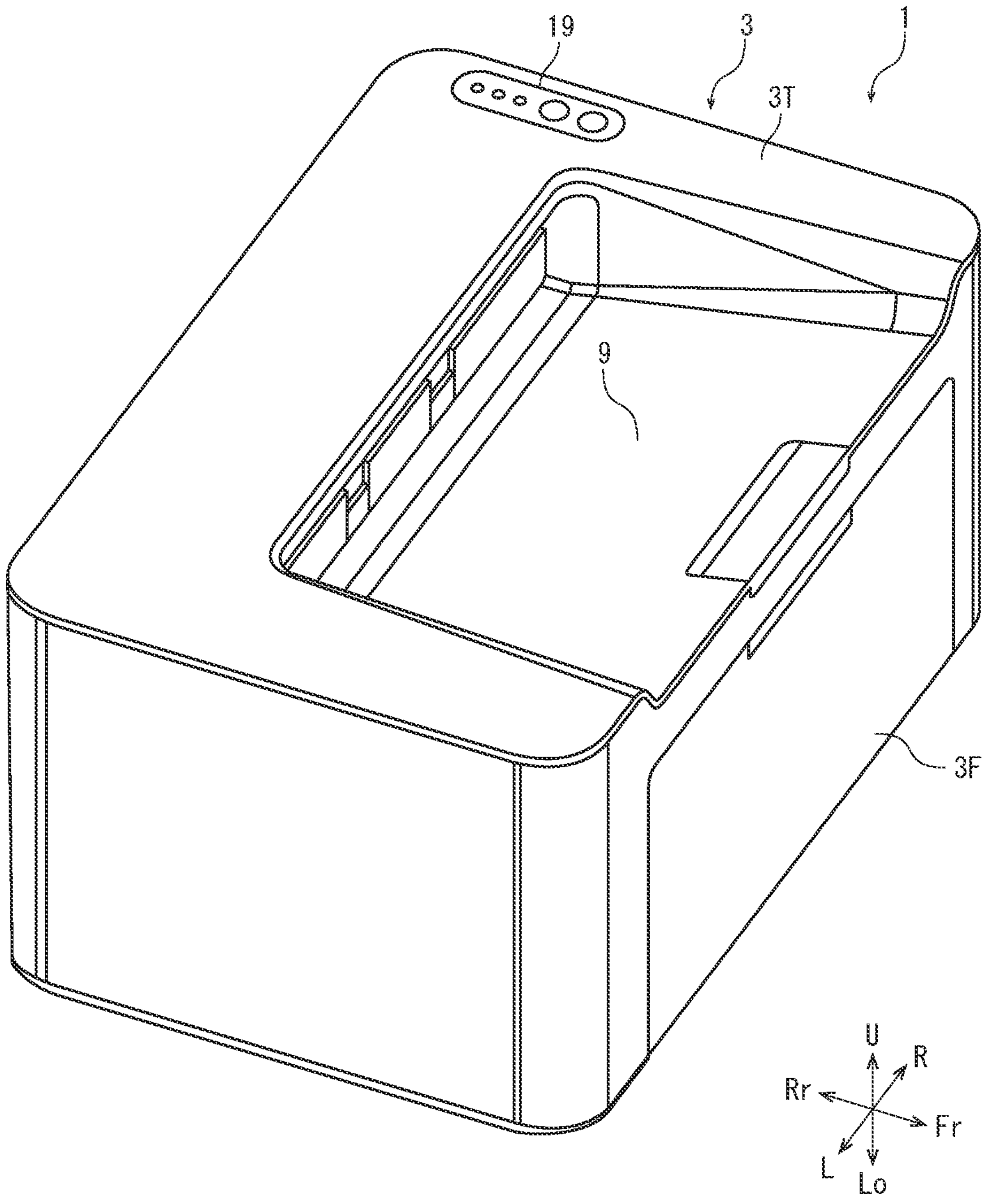
FIG. 1 is a perspective view showing an appearance of a printer according to one embodiment of the present disclosure.
Figure 2:
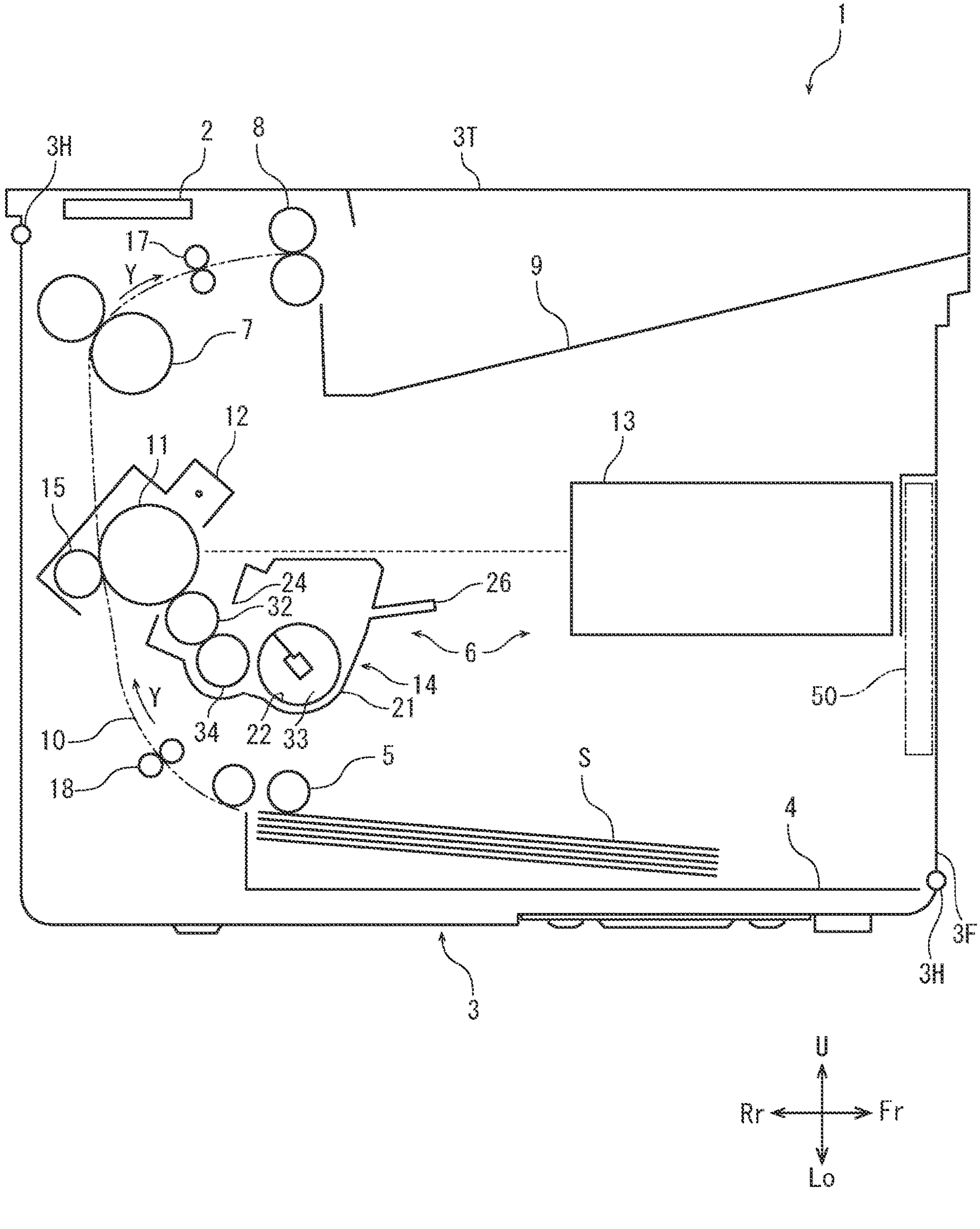
FIG. 2 is a left side view showing an internal structure of the printer according to the embodiment of the present disclosure.
Figure 3:
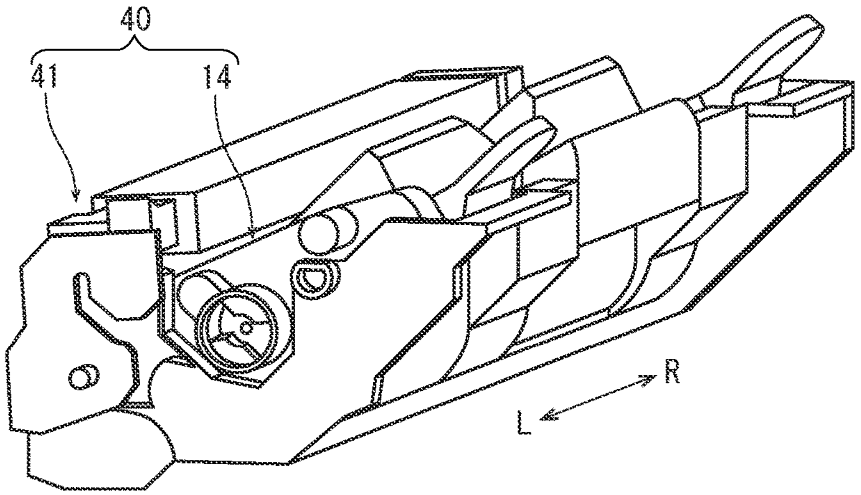
FIG. 3 is a perspective view showing an image forming unit according to the embodiment of the present disclosure.
Figure 4:
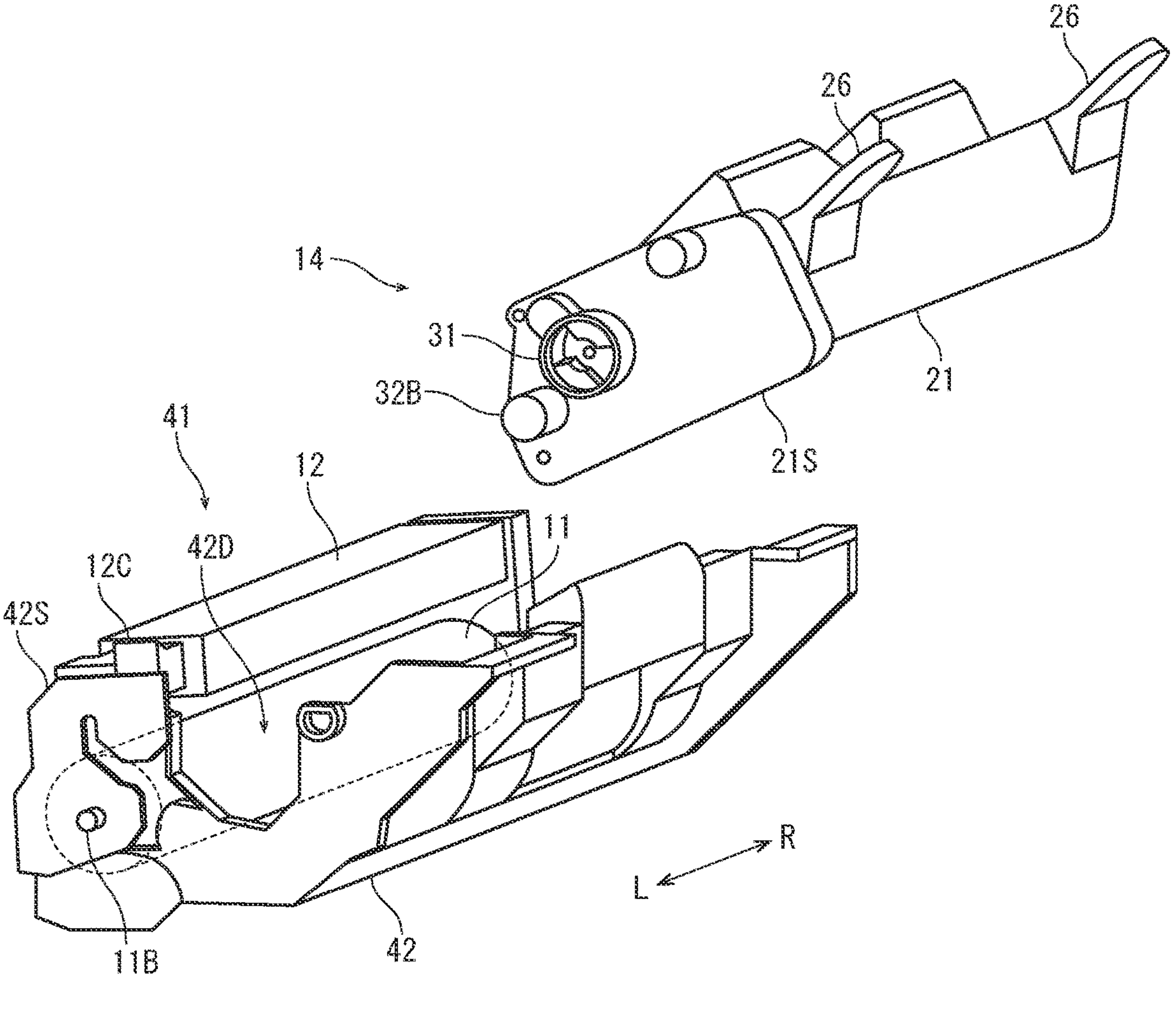
FIG. 4 is a perspective view showing a developing unit and a drum unit according to the embodiment of the present disclosure.

First, the entire structure of the printer 1 will be described. FIG. 1 is a perspective view showing the appearance of the printer 1. FIG. 2 is a left side view schematically showing the internal structure of the printer 1. FIG. 3 is a perspective view showing an image forming unit 40. FIG. 4 is a perspective view showing a developing unit 14 and a drum unit 41. FIG. is a perspective view showing a front portion of a body housing 3. Hereafter, Fr side in FIG. 1 and FIG. 2 is defined as the front side of the printer 1, and the left-and-right direction is described with reference to the direction in which the printer 1 is viewed from the front side. In each figure, U, Lo, L, R, Fr and Rr indicate the upper, lower, left, right, front and rear, respectively.

The printer 1 includes a box-shaped body housing 3. In the lower portion in the body housing 3, a sheet feeding tray 4 on which sheets S are placed and a sheet feeding roller 5 which feeds the sheet S from the sheet feeding tray 4 are provided. Above the sheet feeding tray 4, an image forming device 6 which forms a toner image in an electrophotographic method is provided, and above the image forming device 6, a fixing device 7 which fixes the toner image to the sheet S is provided. In front of the fixing device 7, a discharge roller 8 which discharges the sheet S on which the toner image is fixed is provided.

An upper opening 3A (see FIG. 5) is provided at the upper portion of the body housing 3. An upper plate 3T closing the upper opening 3A can be opened and closed around a hinge 3H provided at the rear end portion. The upper plate 3T is provided with a discharge tray 9 on which the discharged sheet S is stacked. A front opening 3B (see FIG. 5) is provided at the front portion of the body housing 3. A front cover 3F closing the front opening 3B can be opened and closed around a hinge 3H provided at the lower end portion.

The image forming device 6 includes a photosensitive drum 11 whose potential changes with irradiation of light, a charging device 12 which charges the photosensitive drum 11 by discharging, an exposure device 13 which emits laser light according to image data, a developing unit 14 which supplies the toner to the photosensitive drum 11, and a transfer roller 15 which generates transfer bias. The transfer roller 15 is disposed rearmost, the photosensitive drum 11 is disposed in front of the transfer roller 15, the developing unit 14 is disposed in front of the photosensitive drum 11, and the exposure device 13 is disposed in front of the developing unit 14. Inside the body housing 3, a conveyance path 10 is provided from the sheet feeding roller 5 through the transfer roller 15 and the fixing device 7 to the discharge roller 8. A registration roller 18 is provided in the section between the sheet feeding roller 5 and the transfer roller 15 on the conveyance path 10. A conveyance roller 17 is provided in the section between the fixing device 7 and the discharge roller 8 on the conveyance path 10. The sheet S is conveyed in the Y direction of FIG. 2 along the conveyance path 10.

The control part 2 includes an arithmetic part and a storage part (not shown). The arithmetic part is, for example, a CPU (Central Processing Unit). The storage part includes storage media such as ROM (Read Only Memory), RAM (Random Access Memory) and EEPROM (Electrically Erasable Programmable Read Only Memory). The arithmetic part performs various processes by reading and executing the control program stored in the storage part. The control part 2 may be realized only by an integrated circuit without using software.

A display operation part 19 is provided on the upper surface of the body housing 3. The display operation part 19 includes an indicator lamp and a push button. The control part 2 lights the indicator lamp according to the status of the printer 1, and controls each part of the printer 1 according to the operation detected by the push button.

The basic image forming operation of the printer 1 is as follows. When a print job is input to the printer 1 from an external computer or the like, the sheet feeding roller 5 feeds the sheet S from the sheet feeding tray 4 to the conveyance path 10, the registration roller 18 whose rotation has been stopped corrects the skew of the sheet S, and the registration roller 18 feeds the sheet S to the image forming device 6 at a prescribed timing. In the image forming device 6, the charging device 12 charges the photosensitive drum 11 to a predetermined potential, the exposure device 13 writes an electrostatic latent image on the photosensitive drum 11, the developing unit 14 develops the electrostatic latent image using the toner to form the toner image, and the transfer roller 15 transfers the toner image to the sheet S. Subsequently, the fixing device 7 melts the toner image while holding and conveying the sheet S, and fixes the toner image on the sheet S. Then, the discharge roller 8 discharges the sheet S to the discharge tray 9.

Figure 6:
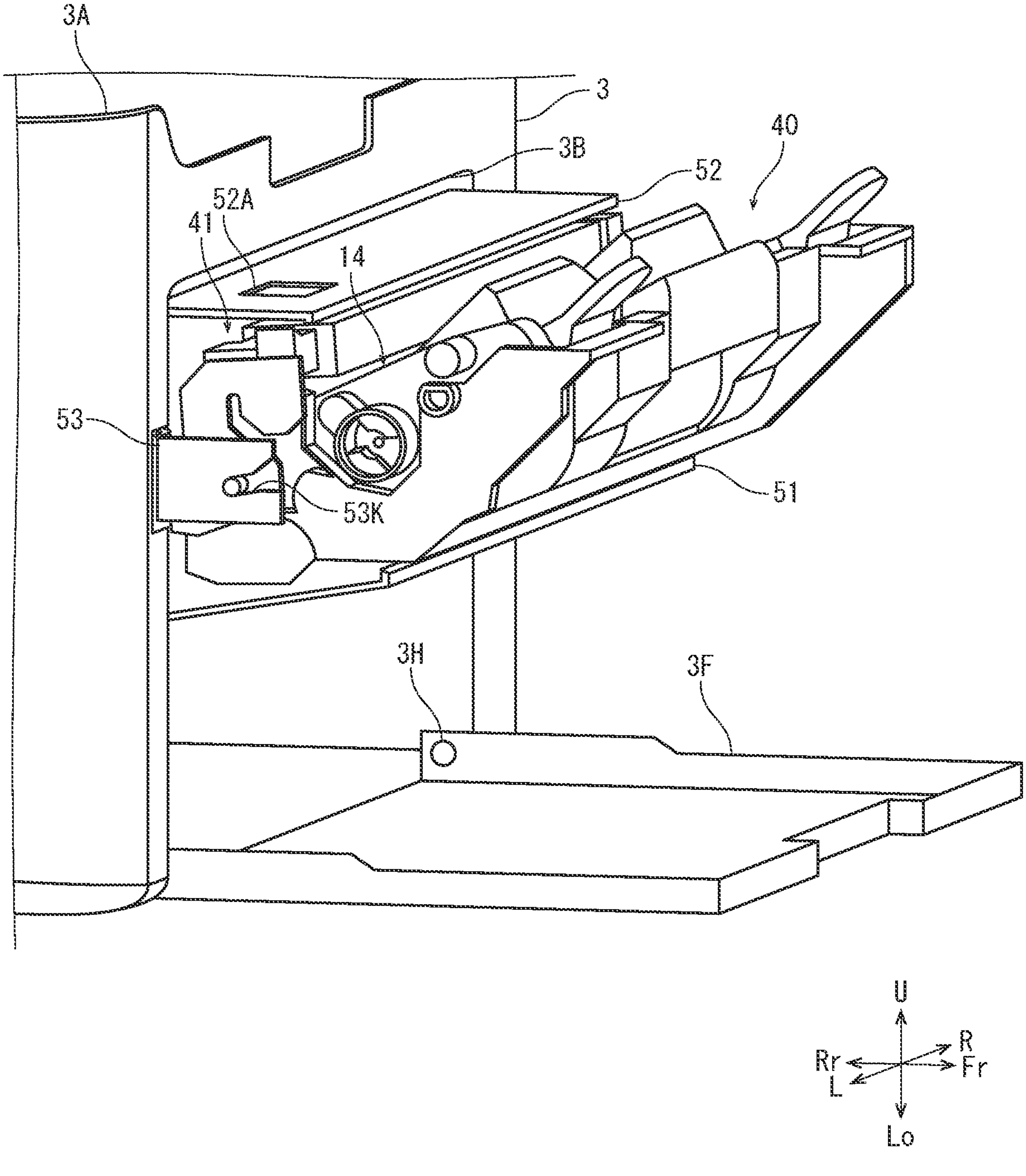
FIG. 6 is a perspective view showing the image forming unit temporarily placed on a temporarily placement part according to the embodiment of the present disclosure.
Figure 7:
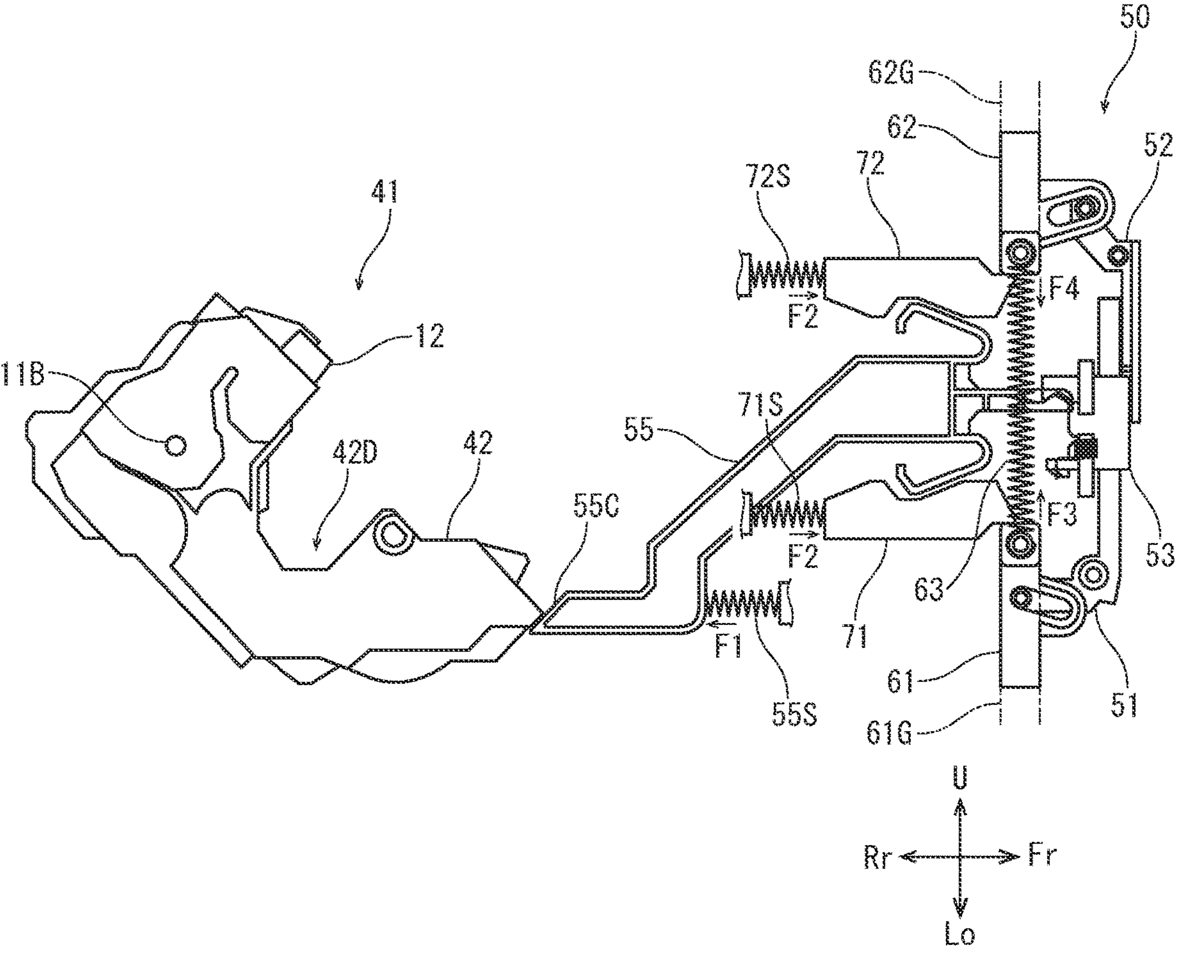
FIG. 7 is a left side view showing a structure of the temporarily placement part according to the embodiment of the present disclosure.
Figure 8:
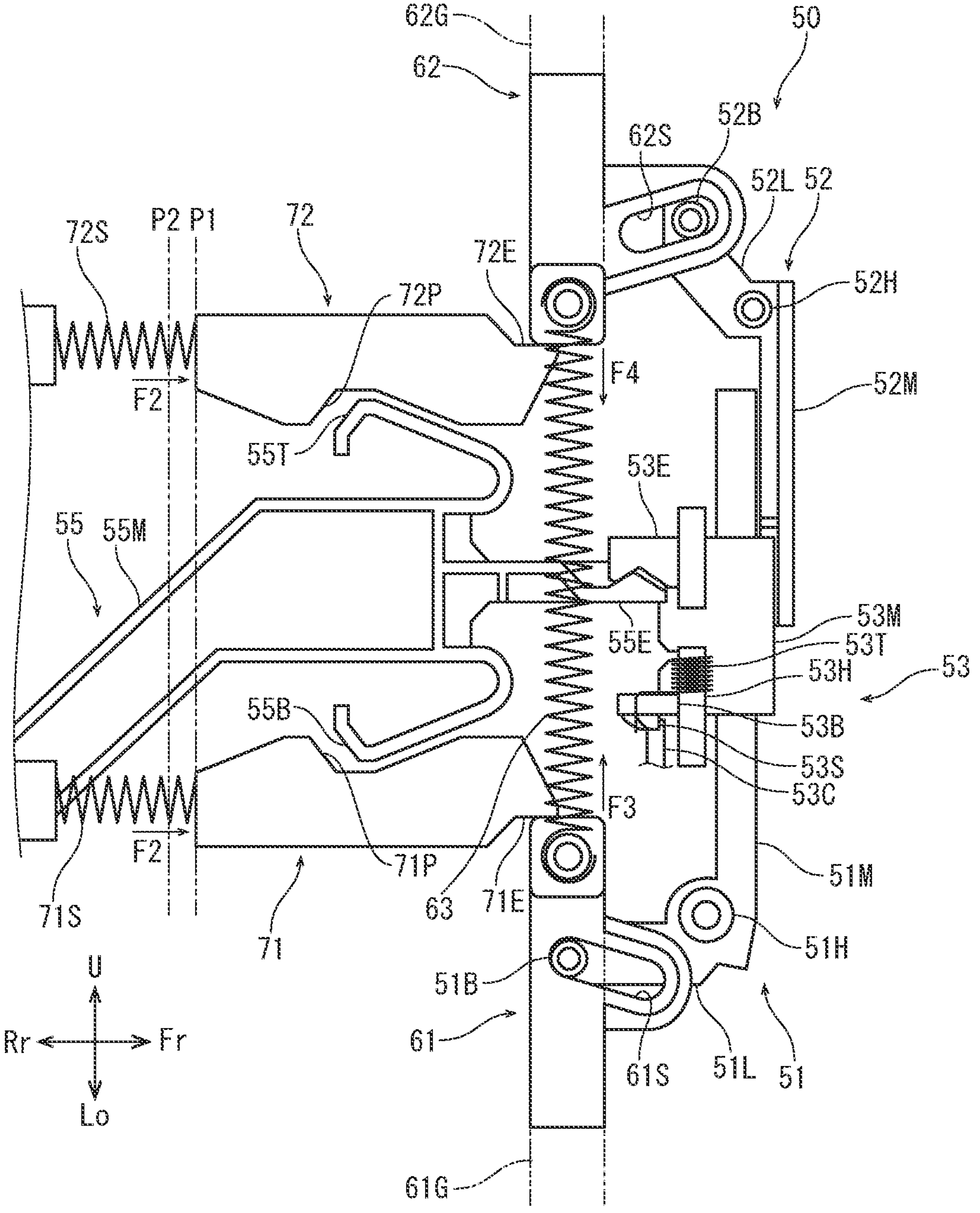
FIG. 8 is a left side view showing the structure of the temporarily placement part according to the embodiment of the present disclosure.
Figure 9:
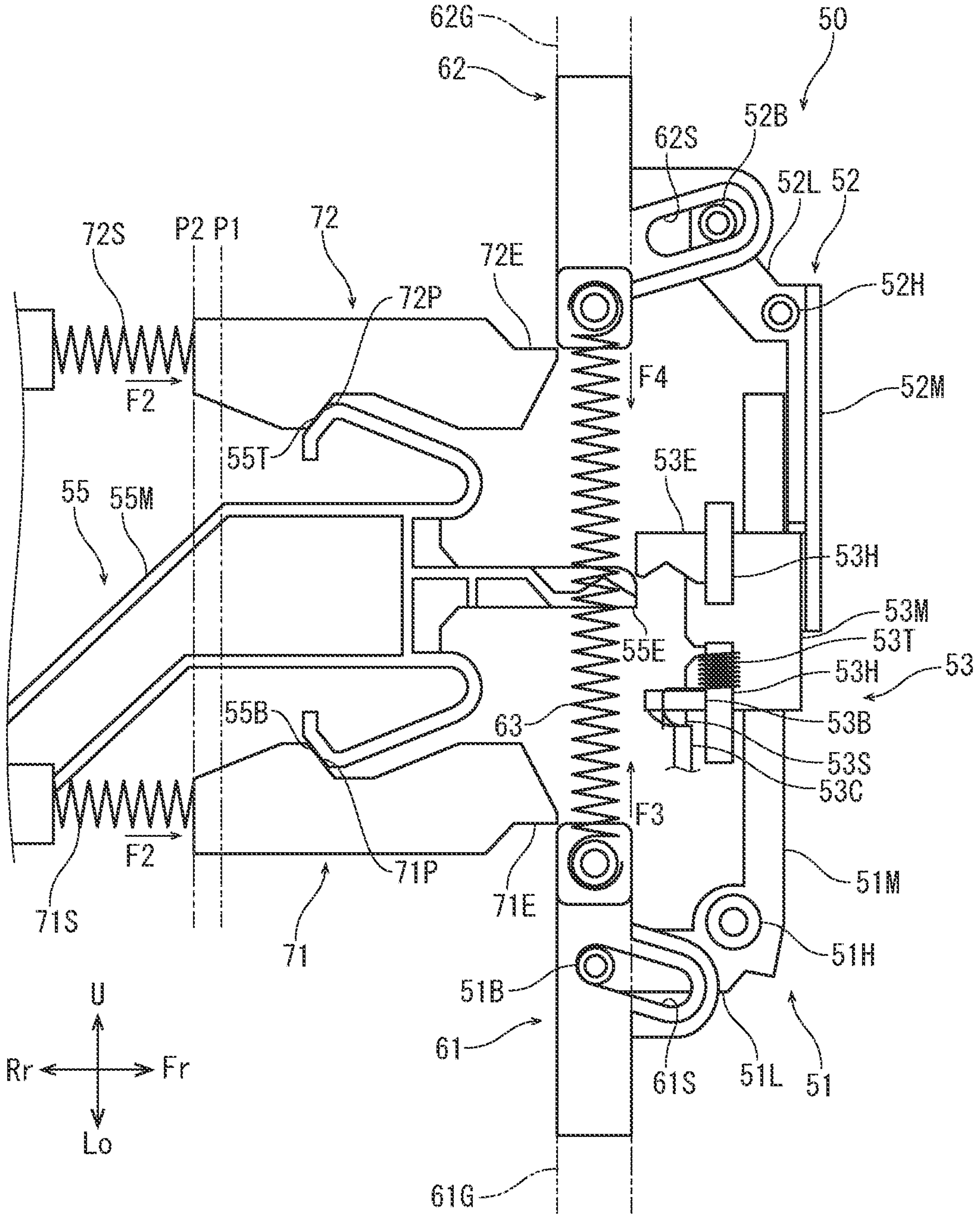
FIG. 9 is a left side view showing an operation of the temporarily placement part according to the embodiment of the present disclosure.
Figure 10:
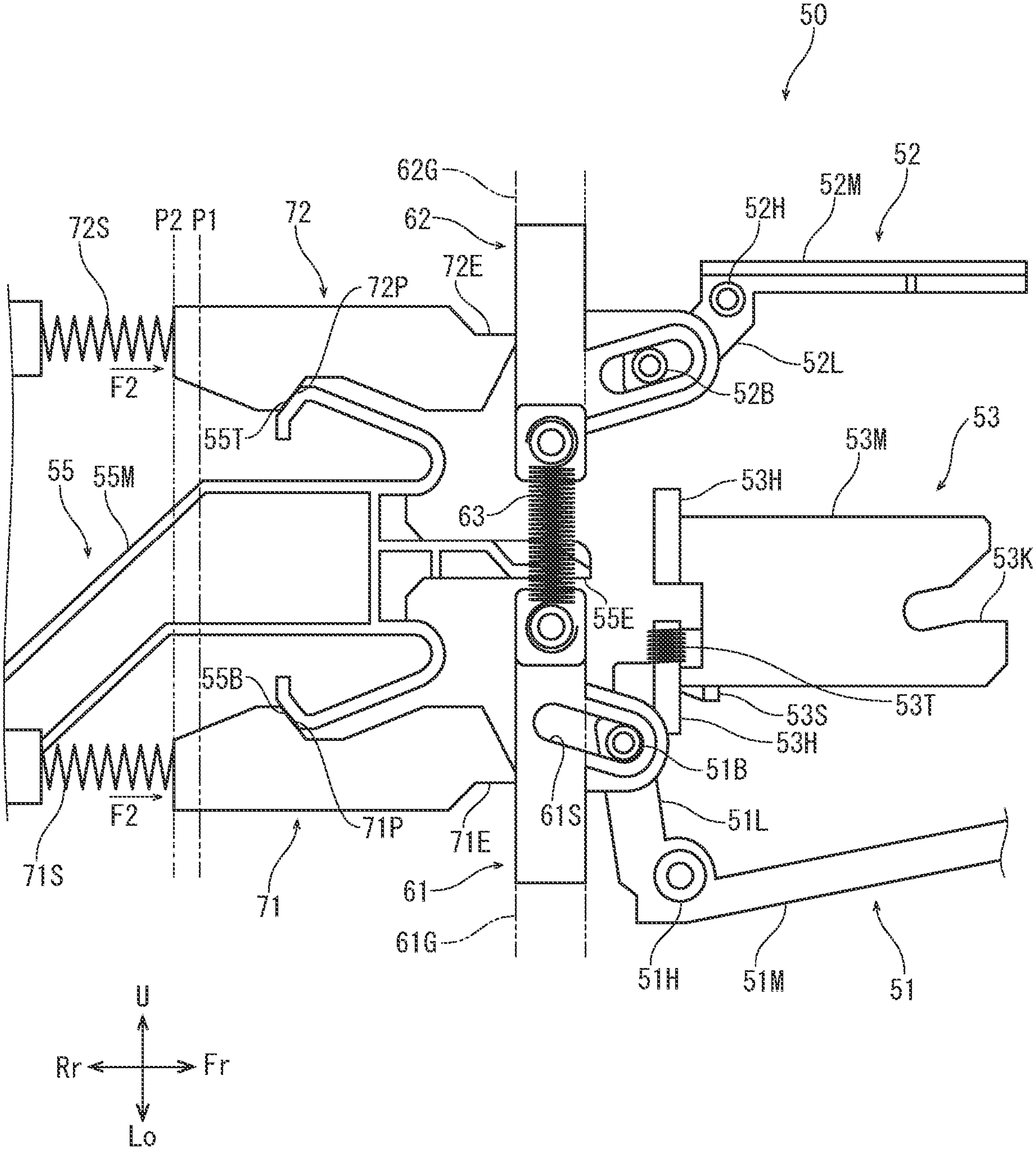
FIG. 10 is a left side view showing the operation of the temporarily placement part according to the present disclosure.
Figure 11:
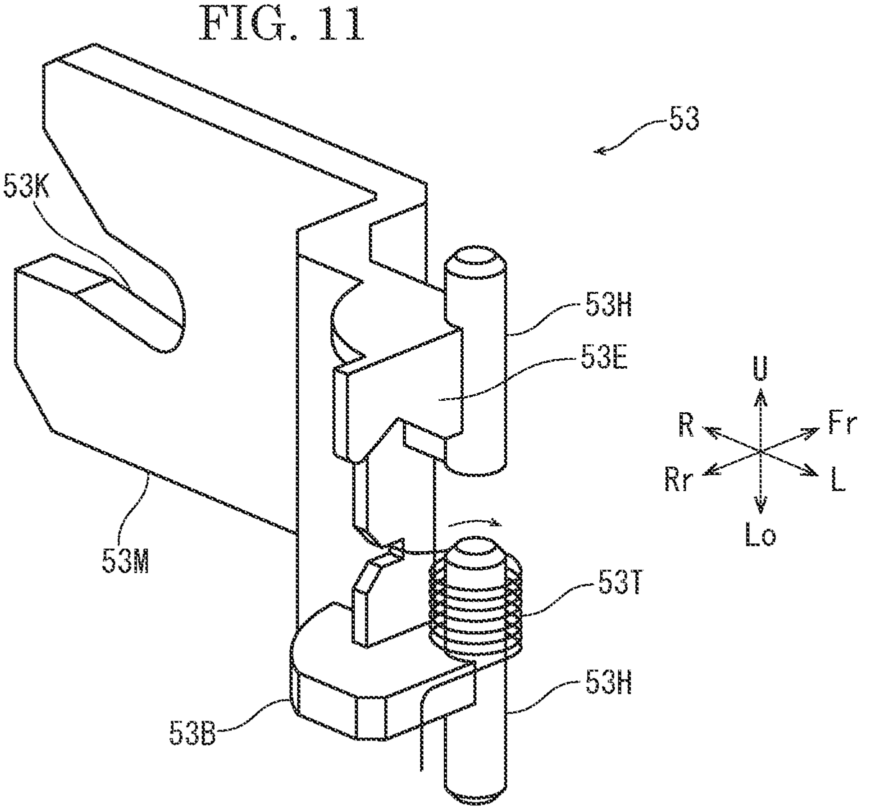
FIG. 11 is a perspective view showing a structure of a side cover according to the embodiment of the present disclosure.
Figure 12:
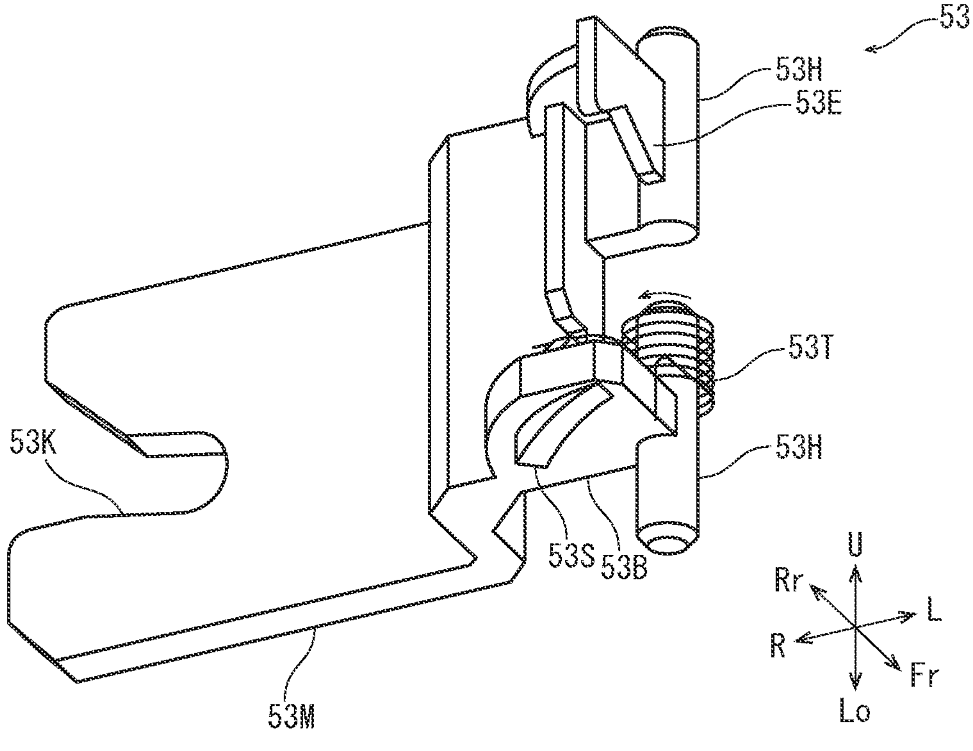
FIG. 12 is a perspective view showing a structure of the side cover according to the embodiment of the present disclosure.

Next, the structure of the image forming unit 40 will be described. FIG. 6 is a perspective view showing the image forming unit 40 temporarily placed on a temporarily placement part 50. FIG. 7 and FIG. 8 are left side views showing the structure of the temporarily placement part 50. FIG. 9 and FIG. 10 are left side views showing the operation of the temporarily placement part 50. FIG. 11 and FIG. 12 are perspective views showing the structure of a side cover 53.

The printer 1 according to the embodiment includes an image forming unit 40 which forms an image, the body housing 3 to which the image forming unit 40 is attached and detached, and a temporarily placement part 50 which is deployed on the lateral side of the body housing 3 and on which the image forming unit 40 can be temporarily placed, and the temporarily placement part 50 is provided with an upper cover 52 covering the upper portion of the image forming unit 40 placed on the temporarily placement part 50. Specifically, they are described below.

[Image Forming Unit]

The image forming unit 40 (see FIG. 3) includes a drum unit 41 and the developing unit 14. The image forming unit 40 is detachable from the body housing 3. The developing unit 14 is detachable from the drum unit 41 (see FIG. 4). The image forming unit 40 may be attached to and detached from the body housing 3 with the developing unit 14 attached to the drum unit 41. When the image forming unit 40 is detached, the developing unit 14 may be detached from the drum unit 41 and then the drum unit 41 may be detached from the body housing 3. When the image forming unit 40 is attached, the drum unit 41 may be attached to the body housing 3 and then the developing unit 14 may be attached to the drum unit 41.

[Drum Unit]

The drum unit 41 includes a box-shaped drum housing 42 whose longitudinal direction is along the left-and-right direction. The drum housing 42 houses the photosensitive drum 11, the charging device 12, and the transfer roller 15 (see FIG. 2). Drum bearings 11B, which support the shaft of the photosensitive drum 11, protrude from the left and right side walls 42S of the drum housing 42 (see FIG. 4). The charging device 12 is provided above the photosensitive drum 11. In the drum housing 42, a developing unit housing 42D in which the developing unit 14 is housed is provided in front of the photosensitive drum 11. The developing unit housing 42D is formed into a concave shape with an upper surface opened. The drum unit 41 includes a biasing member (not shown) which biases the developing unit 14 in the direction of pressing the developing roller 32 against the photosensitive drum 11. The biasing member includes, for example, a compression coil spring.

[Developing Unit]

The developing unit 14 includes a box-shaped developing housing 21 whose longitudinal direction is long the left-and-right direction. Gipping parts 26 protrude forward from both the left and right end portions of the developing housing 21. In the developing housing 21, a stirring chamber 22 which is an elongated space in the left- and right-direction is provided (see FIG. 2). In the stirring chamber 22, a paddle 33 having a shaft along the left-and-right direction is provided. The paddle 33 stirs the developer filled in the stirring chamber 22. The developer is a non-magnetic, one-component developer.

A supply roller 34 is provided behind the stirring chamber 22. A developing roller 32 is provided on the rear and upper oblique side of the supply roller 34. The developer stirred in the stirring chamber 22 is supplied to the developing roller 32 by the supply roller 34. An opening (not shown) is provided in the developing housing 21 at a position facing the photosensitive drum 11. A part of the outer circumferential surface of the developing roller 32 is exposed through the opening over the entire axial direction of the developing roller 32. Developing roller bearings 32B which support the shaft of the developing roller 32 protrude from the left and right side wall 21S of the developing housing 21.

[Coupling]

The body housing 3 is provided with a motor and a reduction gears train (not shown). The reduction gear train transmits driving force to a driven gear (not shown) provided on the photosensitive drum 11. A coupling 31 is provided at the left end portion of the developing housing 21. The coupling 31 is connected to one of the idler gears (not shown) included in the reduction gear train. This idler gear is connected to the upper plate 3T by a link mechanism and a cam mechanism (not shown), and is separated from the coupling 31 by retreating leftward in conjunction with the opening of the upper plate 3T, and is connected to the coupling 31 by advancing rightward in conjunction with the closing of the upper plate 3T. An idler gear (not shown) coaxial with the coupling 31 is provided inside the developing housing 21. This idler gear transfers driving force to a driven gear (not shown) provided on the developing roller 32.

[Temporarily Placement Part]

The temporarily placement part 50 is provided in the space between the front cover 3F and the exposure device 13 (see FIG. 2). The temporarily placement part 50 includes a loading part 51, an upper cover 52, and side covers 53 (see FIG. 5). The temporarily placement part 50 is deployed forward from the body housing 3 in conjunction with the detachment of the image forming unit 40, and the detached image forming unit 40 is temporarily placed (see FIG. 6). The forward deployment of the temporarily placement part 50 means that the loading part 51, the upper cover 52 and the side covers 53 are opened forward.

[Loading Part]

The loading part 51 (see FIG. 8) includes a generally rectangular plate-shaped body part 51M, hinges 51H whose axial direction is along the left-and-right direction, levers 51L, and bosses 51B. The hinges 51H are provided near the centers in the upper-and-lower direction of the left and right side edges of the front opening 3B. When the loading part 51 is closed (see FIG. 8), the body part 51M stands upright above the hinges 51H. When the loading part 51 is opened (see FIG. 10), the body part 51M is positioned in front of the hinges 51H in an inclined posture where the front portion is higher than the rear portion.

The lever 51L protrudes rearward near the hinge 51H of the body part 51M. The boss 51B protrudes leftward from the tip end portion of the lever 51L. The loading opening 51A penetrates the body part 51M in the thickness direction. The loading opening 51A is provided such that air is blown on or sucked from the space between the drum unit 41 and the body part 51M. Dust falling on the body part 51M is removed by the blowing or sucking air.

[Upper Cover]

The upper cover 52 (see FIG. 8) includes a generally rectangular plate-like body part 52M, hinges 52H whose longitudinal direction is long the left-and-right direction, levers 52L and bosses 52B. The hinges 52H are provided near the upper ends of the left and right side edges of the front opening 3B. When the upper cover 52 is closed (see FIG. 8), the body part 52M is in a hanging posture below the hinges 52H. When the upper cover 52 is opened (see FIG. 10), the body part 52M is positioned in front of the hinges 52H in a nearly horizontal posture.

The lever 52L protrude in the rear and upper obliquely from near the hinge 52H of the upper cover 52. The boss 52B protrudes leftward from the tip end portion of the lever 52L. The upper cover opening 52A penetrates the body part 52M in the thickness direction. The upper cover opening 52A is provided such that the discharge wire (not shown) provided in the charging device 12 is cleaned.

[Side Cover]

The side cover 53 (see FIG. 8, FIG. 11 and FIG. 12) includes a generally rectangular plate-shaped body part 53M, hinge shafts 53H whose axial direction is along the upper-and-lower direction and a torsion coil spring 53T. In FIG. 11 and FIG. 12, only the left side cover 53 is shown. Only the left side cover 53 is described here because the right side cover 53 has a common configuration except that it has a symmetrical shape with respect to the left side cover. The hinge shaft 53H is fitted into a hinge hole (not shown) provided in the body housing 3. The hinge shaft 53H is joined slightly below the center in the upper-and-lower direction of the left and right side edges of the front opening 3B. When the side cover 53 is closed (see FIG. 8), the body part 53M is positioned on the right side of the hinge shaft 53H. When the side cover 53 is opened (see FIG. 10), the body part 53M is positioned in front of the hinge shaft 53H. The body part 53M is provided with a holding part 53K for holding the drum bearing 11B. The holding part 53K is notched in a slightly downward inclined direction from the opposite edge to the hinge shaft 53H of the body part 53M.

The torsion coil spring 53T is wound around the hinge shaft 53H. The torsion coil spring 53T biases the body part 53M such that the body part 53M opens forward. The hinge shaft 53H has a bottom plate part 53B below the torsion coil spring 53T. On the lower surface of the bottom plate part 53B, a rotation prevention part 53S protruding downward is provided. The rotation prevention part 53S is formed in an arc shape when viewed from below and is formed in a wedge shape with an amount of protrusion larger in the counterclockwise direction. The body housing 3 is provided with a contact part 53C coming into contact with the rotation prevention part 53S. The hinge shaft 53H has an engaging portion 53E above the torsion coil spring 53T. The engaging portion 53E is provided in a direction that protrudes rearward when the side cover 53 is closed. The lower edge of the engaging portion 53E is cut into a V-shape.

[Interlocking Member]

An interlocking member 55 includes a rod-shaped body part 55M arranged in an inclined posture such that the front portion is higher than the rear portion as a whole. The rear end portion of the body part 55M is provided with a contact part 55C coming into contact with the front end portion of the drum housing 42. The body part 55M is biased rearward (in the F1 direction in FIG. 7) by a compression coil spring 55S. A lower pressing part 55B protruding downward is provided at the lower portion of the front end portion of the body part 55M. An upper pressing part 55T protruding upward is provided at the upper portion of the front end portion of the body part 55M. The lower pressing part 55B and the upper pressing part 55T are formed in a mountain shape. At the front end portion of the body part 55M, an engaging portion 55E protruding forward is provided. The front end portion of the engaging portion 55E is formed into a mountain shape corresponding to the engaging portion 53E of the side cover 53.

[Lower Link]

A lower link 61 is provided behind the loading part 51. The body housing 3 includes a guide portion 61G which guides the lower link 61 in the upper-and-lower direction. The lower link 61 has a slit 61S inclined such that the front portion is lower than the rear portion. The boss 51B of the loading part 51 is arranged inside the slit 61S, and can slide along the slit 61S.

[Upper Link]

An upper link 62 is provided behind the upper cover 52. The body housing 3 includes a guide portion 62G which guides the upper link 62 in the upper-and-lower direction. The upper link 62 has a slit 62S inclined such that the front portion is higher than the rear portion. The boss 52B of the upper cover 52 is arranged inside the slit 62S, and can slide along the slit 62S. The lower link 61 and the upper link 62 are connected by a tension coil spring 63, and are biased to pull against each other. That is, the lower link 61 is biased upward (in the F3 direction in FIG. 8) and the upper link 62 is biased downward (in the F4 direction in FIG. 8).

[Lower Restriction Member]

A lower restriction member 71 is provided below the lower pressing part 55B of the interlocking member 55. The lower restriction member 71 is provided with a pressed part 71P cut into a V-shape corresponding to the lower pressing part 55B. The lower restriction member 71 includes an engaging portion 71E which is engaged with the upper end portion of the lower link 61. The lower restriction member 71 is biased forward (in the F2 direction in FIG. 8) by a compression coil spring 71S.

[Upper Restriction Member]

An upper restriction member 72 is provided above the upper pressing part 55T of the interlocking member 55. The upper restriction member 72 is provided with a pressed part 72P cut into a V-shape corresponding to the upper pressing part 55T. The upper restriction member 72 includes an engaging portion 72E which is engaged with the lower end portion of the upper link 62. The upper restriction member 72 is biased forward (in the F2 direction in FIG. 8) by a compression coil spring 72S.

Next, the operation of the above configuration will be described. FIG. 7 and FIG. 8 show a state before the drum unit 41 is removed. As described above, the interlocking member 55 is biased rearward, but because the drum unit 41 is attached to the body housing 3, the lower pressing part 55B and the upper pressing part 55T of the interlocking member 55 are separated from the pressed parts 71P and 72P of the lower restriction member 71 and the upper restriction member 72. The lower restriction member 71 and the upper restriction member 72 are located in the engaging position P1 because they are biased by the compression coil springs 71S and 72S. At the engaging position P1, the engaging portion 71E of the lower restriction member 71 and the engaging portion 72E of the upper restriction member 72 are engaged with the upper end portion of the lower link 61 and the lower end portion of the upper link 62, respectively and the lower link 61 and the upper link 62 are mostly separated from each other. Therefore, the boss 51B of the loading part 51 is in the lower limit position, the boss 52B of the upper cover 52 is in the upper limit position, and the loading part 51 and the upper cover 52 are closed. The engaging portion 55E of the interlocking member 55 is engaged with the engaging portion 53E of the side cover 53.

FIG. 9 shows a state where the drum unit 41 is just detached. When the drum unit 41 is detached, the interlocking member 55 is moved rearward, and the lower pressing part 55B and the upper pressing part 55T press the pressed parts 71P and 72P rearward, respectively. Therefore, the lower restriction member 71 and the upper restriction member 72 are moved to the engaging position P2, and the engagement of the lower link 61 with the upper link 62 is released. In addition, since the hinge shaft 53H of the side cover 53 has play in the upper-and-lower direction, the engaging portion 55E of the interlocking member 55 pushes up the engaging portion 53E of the side cover 53, and the side cover 53 is pushed up. With this action, the rotation prevention part 53S is separated from the contact part 53C.

Then, as shown in FIG. 10, the tension coil spring 63 lifts the lower link 61 and lowers the upper link 62. Then, the boss 51B of the loading part 51 is lifted while sliding along the slit 61S of the lower link 61, and the boss 52B of the upper cover 52 sis lowered while sliding along the slit 62S of the upper link 62. As a result, the loading part 51 and the upper cover 52 are opened forward. Also, the rotation prevention part 53S of the side cover 53 rides on the contact part 53C, and the side cover 53 is opened forward by the torsion coil spring 53T.

After the temporarily placement part 50 is deployed in this way, the user places the image forming unit 40 on the loading part 51. At this time, the drum bearings 11B are engaged with the holding parts 53K of the side covers 53. After maintenance of the image forming unit 40, removal of jammed sheet and the like, the user attaches the image forming unit 40 to the body housing 3. Then, the interlocking member 55 is pushed forward by the drum unit 41. Next, the user folds the loading part 51. Then, the lower link 61 is lowered and the lower restriction member 71 is moved forward, and the engaging portion 71E of the lower restriction member 71 is engaged with the upper end portion of the lower link 61 (see FIG. 8).

Then, the user folds the side cover 53. Then, the rotation prevention part 53S overcomes the contact part 53C, and the engaging portion 53E is engaged with the engaging portion 55E of the interlocking member 55. Next, the user folds the upper cover 52. Then, the upper link 62 is lifted, and the upper restriction member 72 is moved forward, and the engaging portion 72E of the upper restriction member 72 is engaged with the lower end portion of the upper link 62.

According to the printer 1 according to the present embodiment described above, the printer 1 includes the image forming unit 40 which forms an image, the body housing 3 to which the image forming unit 40 is attached and detached, and a temporarily placement part 50 which is deployed on the lateral side of the body housing 3 and on which the image forming unit 40 can be placed, and the temporarily placement part 50 includes the upper cover 52 which covers the upper portion of the image forming unit 40 placed on the temporarily placement part 50. According to this configuration, since the upper portion of the image forming unit 40 placed on the temporarily placement part 50 is covered with the upper cover 52, the adhesion of dust to the photosensitive drum 11 and the developing roller 32 and the light exposure of the photosensitive drum 11 are suppressed. It also reduces the possibility of the user coming into contact with the photosensitive drum 11 or the developing roller 32. Therefore, according to this embodiment, the image forming unit 40 can be protected when the image forming unit 40 is temporarily placed on the temporarily placement part 50 provided in the image forming apparatus.

In addition, according to the printer 1 according to the present embodiment, the image forming unit 40 includes the charging device 12 for charging the photosensitive drum 11, and the upper cover 52 includes then upper cover opening 52A for cleaning the charging device 12 of the image forming unit 40 placed on the temporarily placement part 50. According to this configuration, the charging device 12 can be cleaned with the image forming unit 40 covered with the upper cover 52, so that the user is prevented from touching the photosensitive drum 11, the developing roller 32 and the others when cleaning the charging device 12.

In addition, according to the printer 1 according to the present embodiment, the temporarily placement part 50 includes the loading part 51 on which the image forming unit 40 is placed, and the loading part 51 has the loading opening 51A for blowing or drawing air. Conventionally, there was a risk that dust (paper powder, floating toner, discharge products, or the like) deposited on the loading part 51 would fall into the body housing 3 and adhere to the sheet S when the loading part 51 is closed. According to the present embodiment, the dust can be blown off or sucked up before the loading part 51 is closed, thereby preventing the dust from adhering to the sheet S.

In addition, according to the printer 1 according to this embodiment, the temporarily placement part 50 includes the side covers 53 covering the lateral sides of the image forming unit 40 placed on the temporarily placement part 50. With this configuration, entry of the dust from the lateral side and the light exposure can be suppressed. In addition, the possibility of the user coming into contact with the photosensitive drum 11 or the developing roller 32 can be reduced.

In addition, according to the printer 1 according to the present embodiment, the side cover 53 has the holding parts 53K for holding the image forming unit 40. With this configuration, the image forming unit 40 can be prevented from falling.

According to the printer 1 according to the present embodiment, the temporarily placement part 50 is deployed in conjunction with the detachment of the image forming unit 40. With this configuration, there is no need to deploy the temporarily placement part 50. In addition, the image forming unit 40 can be temporarily placed quickly.

The above embodiment may be modified as follows.

Figure 5:
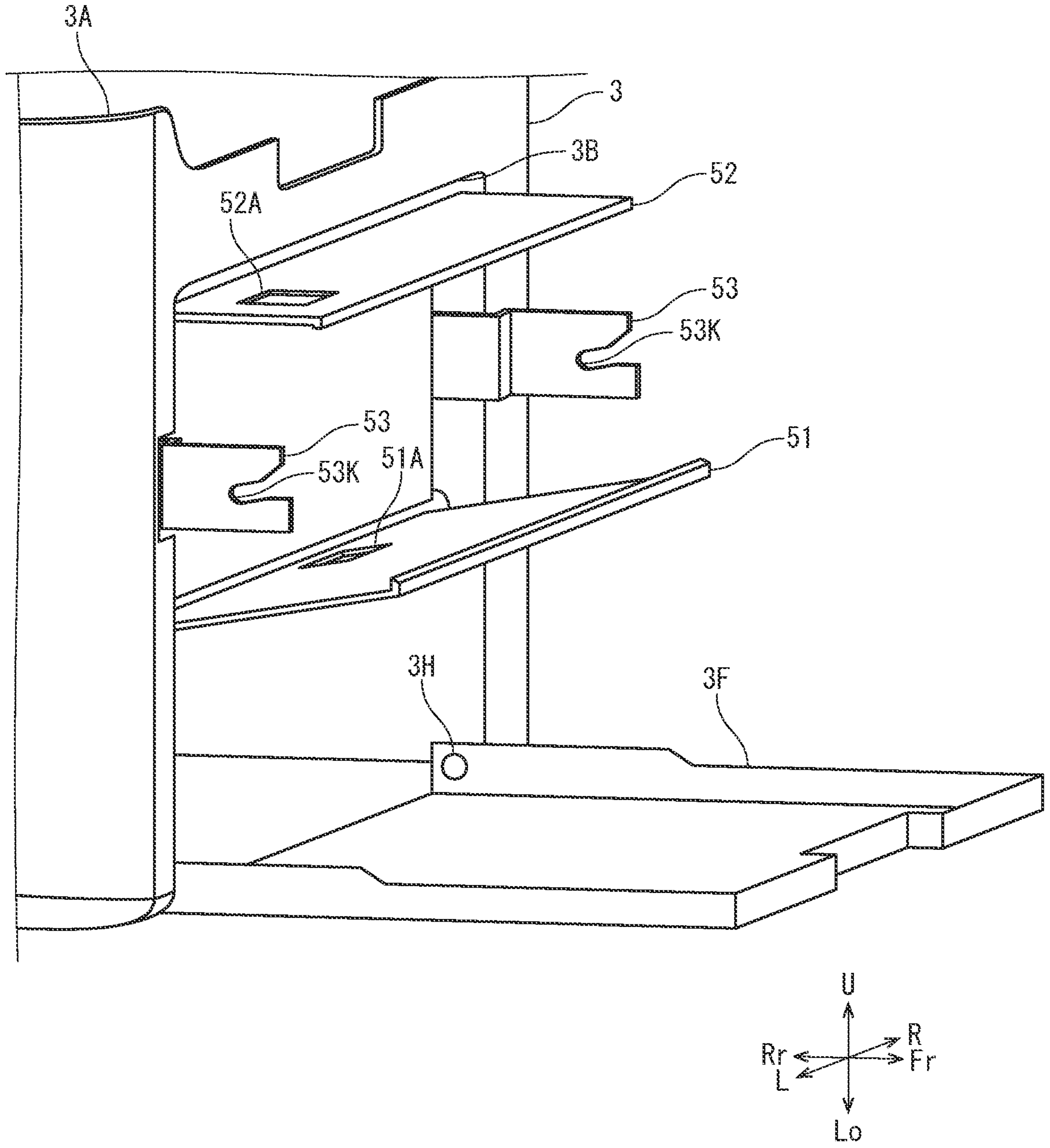
FIG. 5 is a perspective view showing a front portion of a body housing according to the embodiment of the present disclosure.

In the example of FIG. 5, the loading opening 51A is located closer to the hinge 51H than the center portion of the body part 51M, but the loading opening 51A may be located at a position different from the position. For example, since the paper dust often falls from the transfer roller 15, the loading opening 51A may be placed directly under the transfer roller 15.

In the example of FIG. 5, the upper cover opening 52A is provided near the left end portion of the body part 52M. This is because the operation part 12C (see FIG. 4) for cleaning the discharge wire is supposed to be provided at the left end portion of the charging device 12. The position of the upper cover opening 52A may be set according to the position of the actual operation part 12C.

In the above example, the temporarily placement part 50 is deployed in conjunction with the detachment of the image forming unit 40, but the temporarily placement part 50 may be configured to be deployed manually.

The invention claimed is:

1. An image forming apparatus comprising:

an image forming unit which forms an image;

a body housing to and from which the image forming unit is attached and detached; and a temporarily placement part which is deployed outside the body housing and on which the image forming unit can be temporarily placed, wherein the temporarily placement part includes an upper cover which coves an upper portion of the image forming unit placed on the temporarily placement part.

2. The image forming apparatus according to claim 1, wherein the temporarily placement part is connected to the body housing through a hinge.

3. The image forming apparatus according to claim 1, wherein the image forming unit includes a charging device which charges a photosensitive drum, and the upper cover has an upper cover opening through which the charging device of the image forming unit placed on the temporarily placement part is cleaned.

4. The image forming apparatus according to claim 1, wherein the temporarily placement part includes a loading part on which the image forming unit is placed, and the loading part has a loading opening through which air is blown or sucked.

5. The image forming apparatus according to claim 1, wherein the temporarily placement part includes a side cover which covers a lateral side of the image forming unit placed on the temporarily placement part.

6. The image forming apparatus according to claim 5, wherein the side cover includes a holding part by which the image forming unit placed on the temporarily placement part is held.

7. The image forming apparatus according to claim 1, further comprising:

a cover which opens and closes an opening formed in a lateral side surface of the body housing, and the temporarily placement part is disposed inside the cover.

8. The image forming apparatus according to claim 1, wherein the temporarily placement part is deployed in conjunction with a detachment of the image forming unit.

* * * * *